(12) United States Patent
Kalaf et al.

(10) Patent No.: US 10,476,961 B2
(45) Date of Patent: Nov. 12, 2019

(54) CHANGING REBUILD PRIORITY FOR A CLASS OF DATA

(71) Applicant: International Business Machines Corporation, Armonk, NY (US)

(72) Inventors: Dennis A. Kalaf, San Francisco, CA (US); S. Christopher Gladwin, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 16/190,742

(22) Filed: Nov. 14, 2018

(65) Prior Publication Data

US 2019/0082014 A1 Mar. 14, 2019

Related U.S. Application Data

(63) Continuation of application No. 15/719,360, filed on Sep. 28, 2017, now Pat. No. 10,182,115, which is a (Continued)

(51) Int. Cl.
*G06F 15/16* (2006.01)
*H04L 29/08* (2006.01)
(Continued)

(52) U.S. Cl.
CPC .......... *H04L 67/1097* (2013.01); *G06F 11/08* (2013.01); *G06F 11/1076* (2013.01);
(Continued)

(58) Field of Classification Search
CPC .. H04L 67/1097; G06F 11/08; G06F 11/1076; G06F 21/6218; G06F 21/645; H04N 7/17336
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Jonathan A Bui
(74) *Attorney, Agent, or Firm* — Garlick & Markison; Shayne X. Short

(57) ABSTRACT

A computing device includes an interface configured to interface and communicate with a dispersed storage network (DSN), a memory that stores operational instructions, and a processing module operably coupled to the interface and memory that is configured to perform various operations based on operational instructions. The computing device receives name range information and priority level information to handle data objects associated with the name range information and identifies object names associated with a name range. The computing device identifies EDS name ranges that respectively correspond to the object names. The computing device updates an EDS priority table to associate EDS name range(s) with the priority level information. The computing device receives a request associated with an EDS name range and accesses the EDS priority table to identify a priority level associated therewith. The computing device then processes the request based on the priority level associated with the EDS name range.

20 Claims, 6 Drawing Sheets

Related U.S. Application Data continuation-in-part of application No. 14/468,731, filed on Aug. 26, 2014, now Pat. No. 9,781,208.

(60) Provisional application No. 61/898,934, filed on Nov. 1, 2013.

(51) Int. Cl.
| | | |
|---|---|---|
| *H04N 7/173* | (2011.01) | |
| *G06F 21/62* | (2013.01) | |
| *G06F 21/64* | (2013.01) | |
| *G06F 11/10* | (2006.01) | |
| *G06F 11/08* | (2006.01) | |
| *H04L 29/06* | (2006.01) | |
| *H04N 21/231* | (2011.01) | |
| *H04N 21/433* | (2011.01) | |

(52) U.S. Cl.
CPC ........ *G06F 21/6218* (2013.01); *G06F 21/645* (2013.01); *H04N 7/17336* (2013.01); *H04L 63/0823* (2013.01); *H04L 63/101* (2013.01); *H04N 21/23116* (2013.01); *H04N 21/4334* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,509,322 | B2 | 3/2009 | Miloushev et al. |
| 7,636,724 | B2 | 12/2009 | de la Torre et al. |
| 8,630,987 | B2 | 1/2014 | Dhuse |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0064562 | A1 | 3/2006 | Mohideen et al. |
| 2006/0136448 | A1 | 6/2006 | Cialini et al. |
| 2006/0156059 | A1 | 7/2006 | Kitamura |
| 2006/0218435 | A1 | 9/2006 | van Ingen et al. |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0287200 | A1 | 11/2010 | Dhuse |
| 2010/0332751 | A1 | 12/2010 | Quigley et al. |
| 2011/0029524 | A1 | 2/2011 | Baptist et al. |
| 2011/0055661 | A1 | 3/2011 | Grube et al. |
| 2011/0071988 | A1 | 3/2011 | Resch et al. |
| 2011/0264717 | A1* | 10/2011 | Grube ................. G06F 11/0727 707/827 |
| 2011/0289122 | A1* | 11/2011 | Grube ................. G06F 11/2094 707/812 |
| 2011/0311051 | A1 | 12/2011 | Resch et al. |
| 2011/0314355 | A1 | 12/2011 | Grube et al. |
| 2013/0132702 | A1 | 5/2013 | Patel |
| 2013/0326264 | A1 | 12/2013 | Resch |
| 2014/0156716 | A1* | 6/2014 | Baptist .................. G06F 16/182 707/827 |
| 2014/0250281 | A1 | 9/2014 | Rao et al. |
| 2014/0351625 | A1* | 11/2014 | Resch ................. G06F 11/1076 714/6.2 |
| 2014/0351674 | A1* | 11/2014 | Grube ................. G06F 11/1076 714/764 |
| 2015/0127699 | A1 | 5/2015 | Leggette et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association or Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

(56) References Cited

OTHER PUBLICATIONS

Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

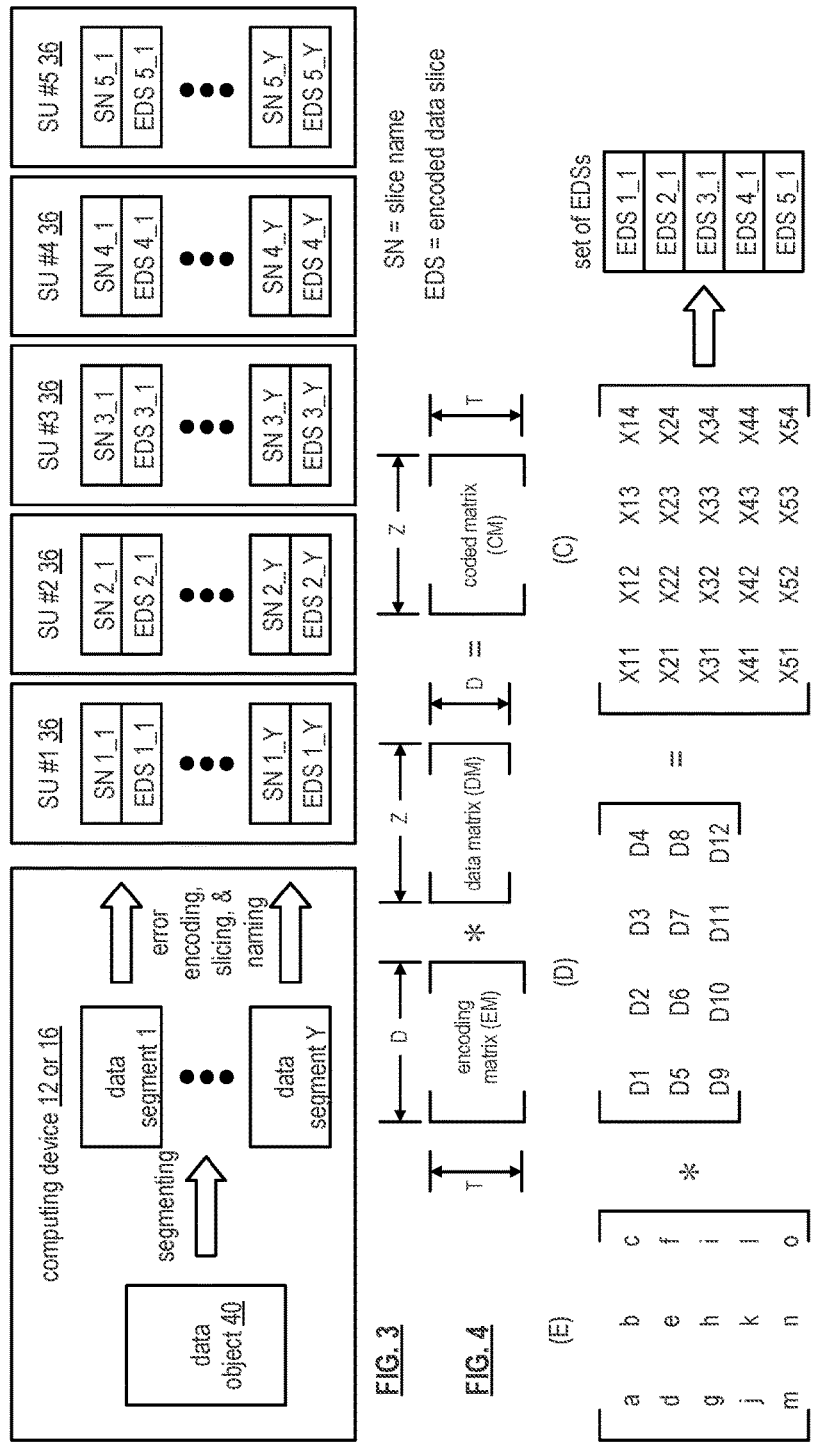

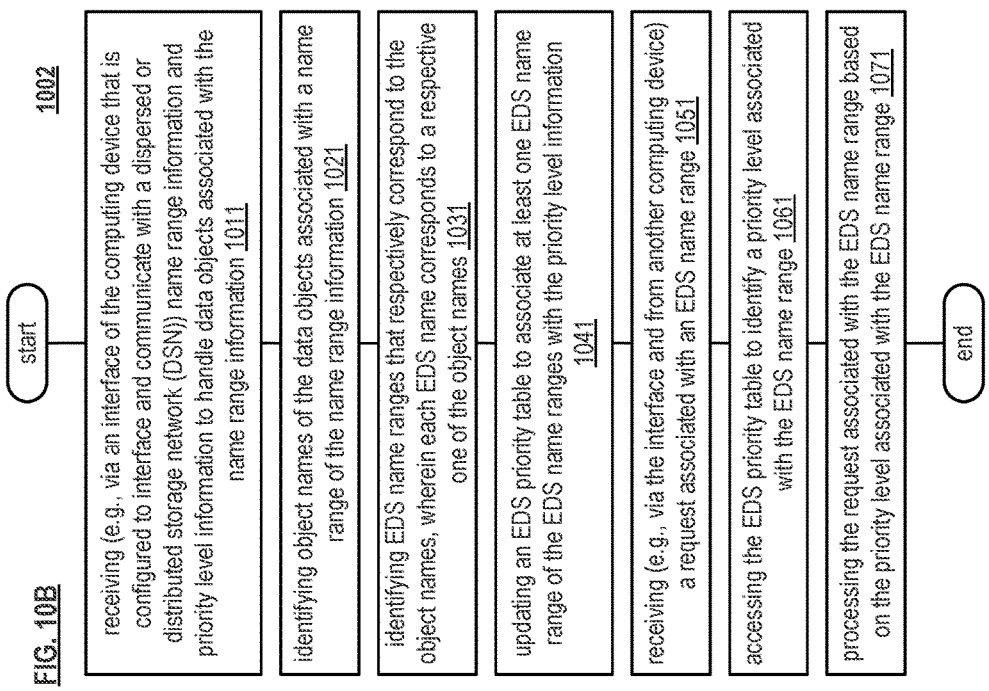
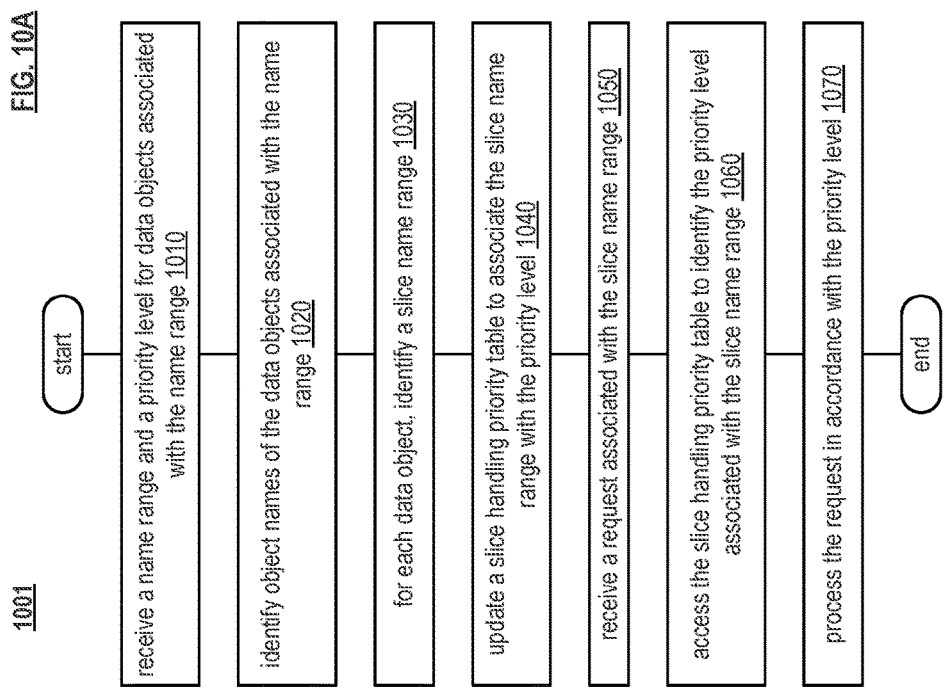

CHANGING REBUILD PRIORITY FOR A CLASS OF DATA

CROSS REFERENCE TO RELATED PATENTS

The present U.S. Utility Patent Application also claims priority pursuant to 35 U.S.C. § 120, as a continuation of U.S. Utility patent application Ser. No. 15/719,360, entitled "CHANGING REBUILD PRIORITY FOR A CLASS OF DATA," filed Sep. 28, 2017, pending, which claims priority pursuant to 35 U.S.C. § 120, as a continuation-in-part (CIP) of U.S. Utility patent application Ser. No. 14/468,731, entitled "OBTAINING DISPERSED STORAGE NETWORK SYSTEM REGISTRY INFORMATION," filed Aug. 26, 2014, now issued as U.S. Pat. No. 9,781,208 on Oct. 3, 2017, which claims priority pursuant to 35 U.S.C. § 119(e) to U.S. Provisional Application No. 61/898,934, entitled "UPDATING REGISTRY INFORMATION OF A DISPERSED STORAGE NETWORK," filed Nov. 1, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems generally operate to service data access requests based on the order in which they are received. For example, a first received data access request is received and serviced, then a second received data access request is received and serviced, and so on. The prior art fails to provide means by adequate means by which different respective data access requests may be serviced in other manners.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10A is a flowchart illustrating an example of prioritizing slice handling in accordance with the present invention; and FIG. 10B is a diagram illustrating another embodiment of a method for execution by one or more computing devices in accordance with the present invention.

DETAILED DESCRIPTION OF THE INVENTION

Figure 1:
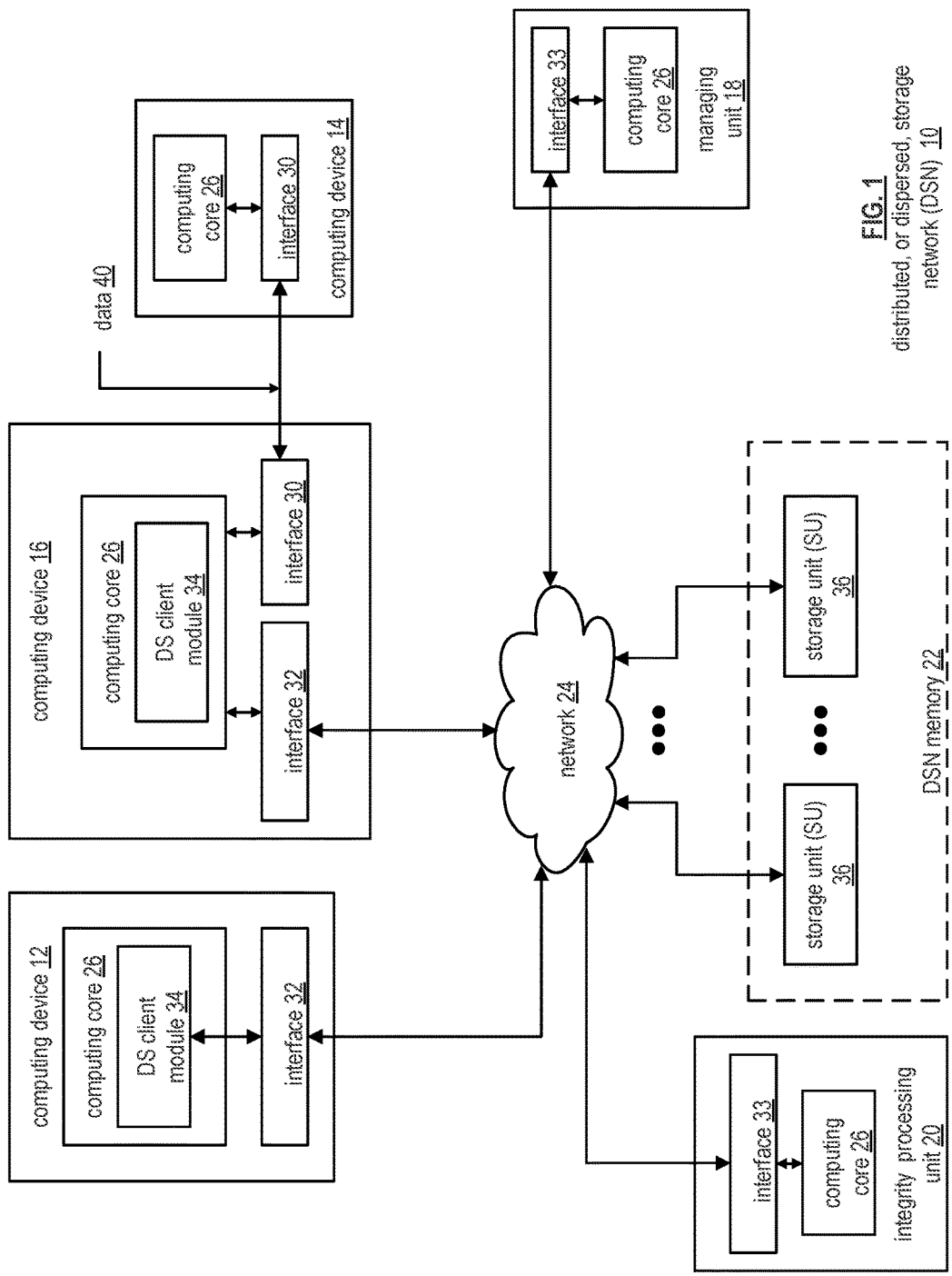
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
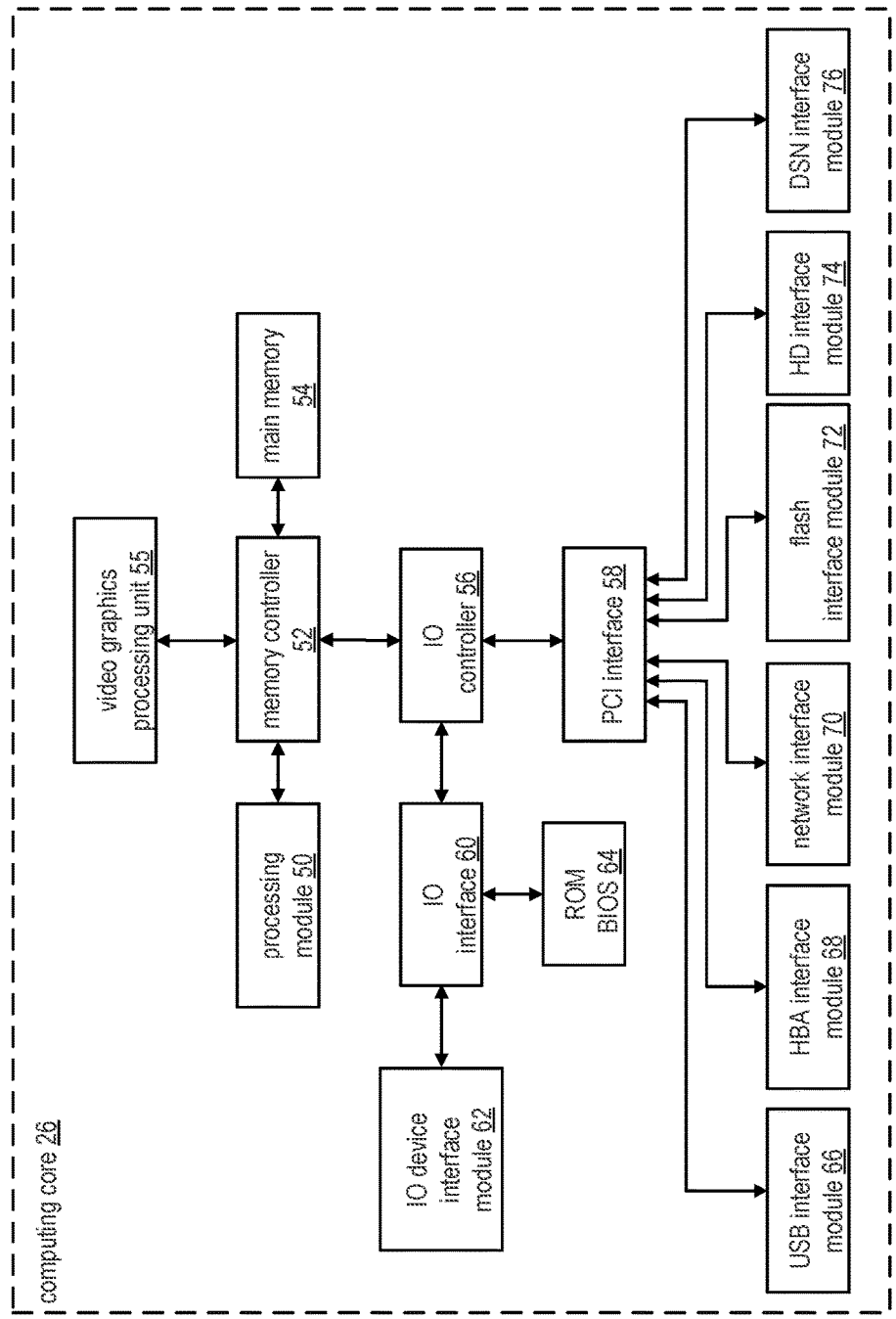
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
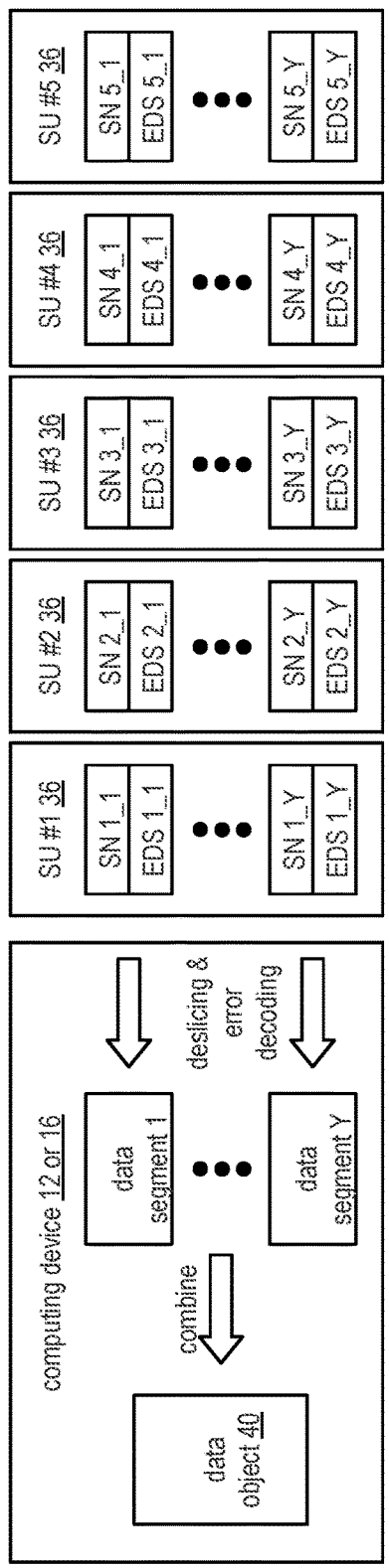
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
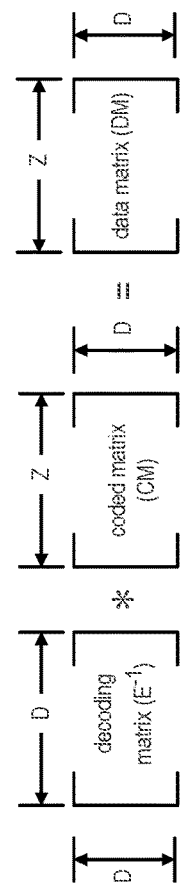
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
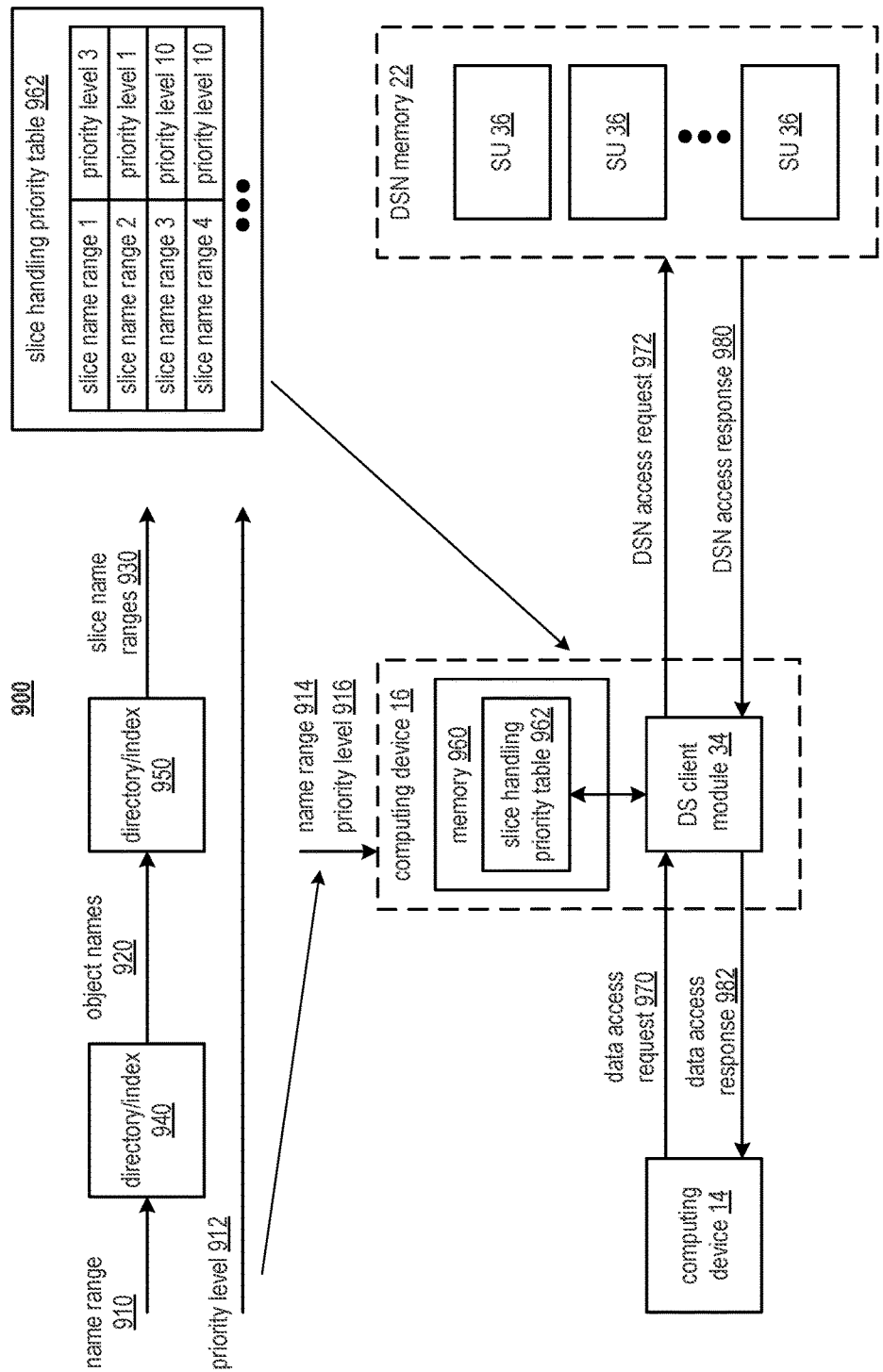
FIG. 9 is a schematic block diagram of another embodiment of a dispersed storage network (DSN) in accordance with the present invention.

FIG. 9 is a schematic block diagram of another embodiment of a dispersed storage network (DSN) in accordance with the present invention. This diagram is a schematic block diagram of another embodiment of a dispersed storage network (DSN) that includes the computing device 14, the computing device 16, and the DSN memory 22 of FIG. 1. The DSN memory 22 includes a plurality of storage units (SUs) 36 of FIG. 1. The computing device 16 includes the DS client module 34 of FIG. 1 and a memory. The system is operable to process data access requests (e.g., such as data access request 970) from the computing device 14 with regards to prioritizing the processing of DSN access requests 972 sent to the DSN memory 22, prioritizing the receiving of DSN access responses 980 from the DSN memory 22, and issuing data access responses (e.g., such as data access response 982) to the computing device 14 based on the DSN access responses.

In an example of operation, the computing device 16 receives name range information 910 and a priority level 912 (e.g., having a value of 10) for handling data objects associated with the name ranges of the name range information 910. The name ranges indicate a span of names of data objects 920 stored in the DSN memory 22 in accordance with a directory and/or index scheme 940. When the index scheme 940 includes a file system directory, wildcards may be utilized for a portion of pathnames to produce a name range. For example, filenames that includes a path of:

/user/home/jdoe/pictures/2010/birthdayparties/january.jpg and:

/user/home/jdoe/pictures/2014/india-vacation/hotel.jpg share a common pathname of /user/home/jdoe/pictures and a name range of a path of /user/home/jdoe/pictures/* (e.g., where* denotes a wildcard).

Having received the name range information 910, the computing device 16 accesses a directory and/or an index 950 to identify object names within the name range of the name range information 910. As a specific example, the computing device 16 identifies filenames january.jpg and hotel.jpg as object names 920 within the name range. For each object name, the computing device 16 identifies a slice name range based on a directory and/or index lookup (e.g., thereby identifying slice name ranges 930). The computing device 16 updates a slice handling priority table 962 maintained within the memory 960 to include an association of the received priority level and each of the slice name ranges. As a specific example, the computing device 16 updates the slice handling priority table 962 to associate the slice name range 3 (e.g., corresponding to generate.jpg) and slice name range 4 (e.g., corresponding to hotel.jpg) with priority level 10.

The DS client module 34 receives a data access request 970 from a computing device 14 and generates a set of DSN access requests 972 that includes a set of corresponding slice names. The DS client module 34 accesses the slice handling priority table 962 to identify a priority level associated with the slice names by identifying a slice name range that corresponds to a slice name of the set of DSN access requests 972. The DS client module 34 processes handling of the set of DSN access requests 972 in accordance with one or more of the identified priority level and other priority levels associated with other active requests. As a specific example, the DS client module 34 sends the set of DSN access requests 972 to the DSN memory 22 when the priority level of the set of DSN access requests 972 indicates a higher priority than all other pending access requests. The DS client module 34 may further prioritize handling of slices based on the priority level to grant processing of higher priority slices more resources as compared to resources granted to lower processing of lower priority slices. Such resources include one or more of assigned memory, assigned processing threads, allowed link connectivity bandwidth, assigned scratchpad memory, number of concurrent processors, and ordering within one or more processing wait queues.

The DS client module 34 receives DSN access responses 980 from the DSN memory 22 with regards to the set of DSN access requests 972. The DS client module 34 processes the DSN access responses 980 in accordance with the priority level of the slice names associated with the DSN access responses 980. The DS client module 34 provides data access response 982 to the computing device 14.

In an example of operation and implementation, a computing device (e.g., computing device 12, computing device 16, managing unit 18, a SU 36 of the set of SUs, etc.) includes an interface configured to interface and communicate with a dispersed or distributed storage network (DSN), a memory that stores operational instructions, and a processing module operably coupled to the interface and memory such that the processing module, when operable within the computing device based on the operational instructions, is configured to perform various operations. The processing module, when operable within the computing device based on the operational instructions, is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device (e.g., computing device 16) is configured to receive name range information and priority level information to handle data objects associated with the name range information. Note that a data object of the data objects is segmented into a plurality of data segments, and a data segment of the plurality of data segments is dispersed error encoded in accordance with dispersed error encoding parameters to produce a set of encoded data slices (EDSs) that are distributedly stored in a plurality of storage units (SUs) within the DSN.

The computing device is also configured to identify object names of the data objects associated with a name range of the name range information. The computing device is also configured to identify EDS name ranges that respectively correspond to the object names, wherein each EDS name corresponds to a respective one of the object names. In addition, the computing device is configured to update an EDS priority table to associate at least one EDS name range of the EDS name ranges with the priority level information. The computing device is configured to receive, from another computing device, a request associated with an EDS name range. The computing device is also configured to access the EDS priority table to identify a priority level associated with the EDS name range and process the request associated with the EDS name range based on the priority level associated with the EDS name range.

In some examples, the computing device is also configured to access a directory and/or an index to identify the object names of the data objects associated with the name range of the name range information. Also, in certain other examples, the computing device is configured to access the directory and/or the index or another directory and/or another index to identify the EDS name ranges that respectively correspond to the object names.

Also, in some instances, note that the request associated with the EDS name range includes a data access request and/or an EDS request. The data access request includes a data object write request, a data object read request, a data object list request, and/or a data object delete request. The EDS request includes an EDS write request, an EDS read request, an EDS list request, and/or an EDS delete request.

In other examples, the computing device is configured to process the request associated with the EDS name range to generate a set of DSN access requests that includes a set of corresponding EDS names, wherein the EDS name range corresponds to an EDS name of the set of DSN access requests based on an identified priority level and/or at least one other priority level associated with at least one other request.

In some examples, with respect to a data object, the data object is segmented into a plurality of data segments, and a data segment of the plurality of data segments is dispersed error encoded in accordance with dispersed error encoding parameters to produce a set of encoded data slices (EDSs) that are distributedly stored in a plurality of storage units (SUs) within the DSN. In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other computing device, at least one SU of a plurality of SUs within the DSN (e.g., such as a plurality of SUs that are implemented to store distributedly the set of EDSs), etc. In addition, note that such a computing device as described herein may be implemented as any of a number of different devices including a managing unit that is remotely located from another computing device within the DSN and/or SU within the DSN, an integrity processing unit that is remotely located from another computing device and/or SU within the DSN, a scheduling unit that is remotely located from another computing device and/or SU within the DSN, and/or other device. Also, note that such a computing device as described herein may be of any of a variety of types of devices as described herein and/or their equivalents including a SU including a SU of any group and/or set of SUs within the DSN, a wireless smart phone, a laptop, a tablet, a personal computers (PC), a work station, and/or a video game device. Also, note also that the DSN may be implemented to include or be based on any of a number of different types of communication systems including a wireless communication system, a wire lined communication system, a non-public intranet system, a public internet system, a local area network (LAN), and/or a wide area network (WAN).

FIG. 10A is a flowchart illustrating an example of prioritizing slice handling in accordance with the present invention. This diagram is a flowchart illustrating an example of prioritizing slice handling. The method 1001 begins at a step 1010 where a processing module (e.g., of a distributed storage (DS) client module of a device of a dispersed storage network (DSN)) receives a name range and a priority level for data objects associated with the name range. The method 1001 continues at the step 1020 where the processing module identifies object names of the data objects associated with the name range (e.g., performing a directory and/or index lookup using the name range to extract object names corresponding to sets of encoded data slices stored within the DSN). For each data object, the method 1001 continues at the step 1030 where the processing module identifies a slice name range. As a specific example, the processing module accesses the directory and/or index using an object name of the data object to identify one or more ranges of slice names.

Having identified the slice name range, the method 1001 continues at the step 1040 where the processing module updates a slice handling priority table to associate the slice name range with the priority level. As a specific example, the processing module retrieves the slice handling priority table from the DSN, generates a new entry that includes the slice name range and a priority level, updates the slice handling priority table to include the new entry to produce an updated slice handling priority table, and stores the updated slice handling priority table in one or more of a local memory associated with the processing module and the DSN.

The method 1001 continues at the step 1050 where the processing module receives a request associated with the slice name range. The request may include one or more of a data access request (e.g., write, read, list, delete) and an encoded data slice request (e.g., write, read, list, delete). The receiving may include identifying a slice name associated with the request that falls within the slice name range. The method 1001 continues at the step 1060 where the processing module accesses the slice handling priority table to identify the priority level associated with the slice name range. As a specific example, the processing module retrieves the slice handling priority table from the DSN and extracts the entry that includes the slice name range and the priority level based on the slice name range. The method 1001 continues at the step 1070 where the processing module processes the request in accordance with the priority level. The processing includes allocating resources to support the request. As a specific example, the processing module allocates more resources sooner to requests associated with higher priority levels.

FIG. 10B is a diagram illustrating another embodiment of a method 1002 for execution by one or more computing devices in accordance with the present invention. The method 1002 operates in step 1011 by receiving (e.g., via an interface of the computing device that is configured to communicate with a dispersed or distributed storage network (DSN)) name range information and priority level information to handle data objects associated with the name range information. Note that for a data object of the data objects, that data object is segmented into a plurality of data segments, and a data segment of the plurality of data segments is dispersed error encoded in accordance with dispersed error encoding parameters to produce a set of encoded data slices (EDSs) that are distributedly stored in a plurality of storage units (SUs) within the DSN. Also, a decode threshold number of EDSs are needed to recover the data segment.

The method 1002 continues in step 1021 by identifying object names of the data objects associated with a name range of the name range information. The method 1002 then operates in step 1031 by identifying EDS name ranges that respectively correspond to the object names, wherein each EDS name corresponds to a respective one of the object names. The method 1002 continues in step 1041 by updating an EDS priority table to associate at least one EDS name range of the EDS name ranges with the priority level information.

The method 1002 then operates in step 1051 by receiving (e.g., via the interface and from another computing device) a request associated with an EDS name range. The method 1002 continues in step 1061 by accessing the EDS priority table to identify a priority level associated with the EDS name range. The method 1002 continues in step 1071 by processing the request associated with the EDS name range based on the priority level associated with the EDS name range.

In some variants of the method 1002, such a variant method operates by accessing a directory and/or an index to identify the object names of the data objects associated with the name range of the name range information and/or accessing the directory or the index or another directory and/or another index to identify the EDS name ranges that respectively correspond to the object names.

Also, within some variants of the method 1002, the request associated with the EDS name range includes a data access request and/or an EDS request. Also, the data access request includes a data object write request, a data object read request, a data object list request, and/or a data object delete request. Such an EDS request includes an EDS write request, an EDS read request, an EDS list request, and/or an EDS delete request.

In other variants of the method 1002, such a variant method operates by processing the request associated with the EDS name range to generate a set of DSN access requests that includes a set of corresponding EDS names, wherein the EDS name range corresponds to an EDS name of the set of DSN access requests based on an identified priority level and/or at least one other priority level associated with at least one other request.

Note that a read threshold number of EDSs provides for reconstruction of the data segment, and a write threshold number of EDSs provides for a successful transfer of the set of EDSs from a first at least one location in the DSN to a second at least one location in the DSN. In some examples, the set of EDSs is of pillar width and includes a pillar number of EDSs. Also, in certain particular examples, each of the decode threshold number, the read threshold number, and the write threshold number is less than the pillar number, and the write threshold number is greater than or equal to the read threshold number that is greater than or equal to the decode threshold number.

This disclosure presents, among other things, a novel implementation by which a computing device (e.g., a rebuild computing device, a rebuild module, a rebuild device, etc.) is configured to receive various priority levels for different classes of data. Such different classes of data may include data in one or more particular vaults, subsets of data in a vault, or subsets of data reachable through a dispersed index or filesystem hierarchy namespace.

As an example, a vault may store named objects in a pseudo-filesystem hierarchy, in which each object's name is a full path in this pseudo-filesystem hierarchy. For example, consider an object name that is "/user/home/jdoe/pictures/2014/india-vacation/hotel.jpg", and this name is stored within a dispersed index. A rebuild priority indicates a class of data and a priority level. For example, one data class may be "all data reachable under the "/user/home/jdoe/pictures/" pseudo-filesystem hierarchy, within a particular index (specified by the root object of that index), and within a particular vault (specified by a vault name or ID). The priority level is a numerical identifier with higher priority numbers receiving more rebuild resources.

For example, the higher the priority the more frequently scans are run, or the more threads are devoted to rebuilding tasks, or higher bandwidth, insertion into a higher priority rebuild queue, etc. When the rebuild module receives a new rebuild priority it begins by determining the object names, segment names, and slice names for data in that class. For example, if provided with a path in a named object vault, the rebuild module would traverse the index of the range of names covered by the filesystem path provided, to obtain a list of names. Using an algorithm (or finding them referenced in the index or by meta-data objects), it could then determine the object names corresponding to those files, from the object names the rebuild module determines the segment names, and then finally the slice names. The priority level indicated in the rebuild priority is then set for all the slice names belonging to this class, and rebuilding activity and resources are allocated in proportion accordingly. This enables data (even within a single vault) to be treated with various levels of importance. For example, a "trash" folder may be given reduced rebuilding priority compared to data referenced in an "mission-critical projects" folder.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed or distributed storage network (DSN);
memory that stores operational instructions; and
a processor operably coupled to the interface and to the memory, wherein the processor operates within the computing device based on the operational instructions to:
receive, via the interface and from another computing device, a request associated with an encoded data slice (EDS) name range, wherein the EDS name range is included within a plurality of EDS name ranges that respectively correspond to object names, wherein each EDS name corresponds to a respective one of the object names of a plurality of data objects that are distributedly stored in a plurality of storage units (SUs) within the DSN, wherein a data object of the plurality of data objects is segmented into a plurality of data segments, a data segment of the plurality of data segments is dispersed error encoded in accordance with dispersed error encoding parameters to produce a set of encoded data slices (EDSs) that are distributedly stored in at least some of the plurality of SUs within the DSN, and a decode threshold number of EDSs are needed to recover the data segment;
access an EDS priority table to identify a priority level associated with the EDS name range, wherein the EDS priority table specifies a plurality of priority levels associated with the plurality of EDS name ranges; and
process the request associated with the EDS name range based on the priority level associated with the EDS name range including resources within the DSN, via the interface, wherein an amount of resources within the DSN that are allocated corresponds to the priority level, and wherein a first priority level of the plurality of priority levels associated with the plurality of EDS name ranges corresponds to a first amount of resources within the DSN, and a second priority level of the plurality of priority levels associated with the plurality of EDS name ranges corresponds to a second amount of resources within the DSN that is less than the first amount of resources within the DSN based on the first priority level being higher than the second priority level.

2. The computing device of claim 1, wherein the processor operates within the computing device based on the operational instructions, is further configured to:
receive name range information and priority level information to handle the plurality of data objects associated with the name range information;
identify object names of the plurality of data objects associated with a name range of the name range information;
identify EDS name ranges that respectively correspond to the object names, wherein each EDS name range corresponds to a respective one of the object names; and
update the EDS priority table to associate at least one EDS name range of the EDS name ranges with the priority level information.

3. The computing device of claim 1, wherein:
the request associated with the EDS name range includes at least one of a data access request or an EDS request;
the data access request includes at least one of a data object write request, a data object read request, a data object list request, or a data object delete request; and
the EDS request includes at least one of an EDS write request, an EDS read request, an EDS list request, or an EDS delete request.

4. The computing device of claim 1, wherein the processor operates within the computing device based on the operational instructions, is further configured to:
process the request associated with the EDS name range to generate a set of DSN access requests that includes a set of corresponding EDS names, wherein the EDS name range corresponds to an EDS name of the set of DSN access requests based on at least one of an identified priority level or at least one other priority level associated with at least one other request.

5. The computing device of claim 1, wherein:
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

6. The computing device of claim 1, wherein the computing device is located at a first premises that is remotely located from a second premises of at least one SU of the plurality of SUs within the DSN.

7. The computing device of claim 1, wherein the computing device is a SU of the plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
an interface configured to interface and communicate with a dispersed or distributed storage network (DSN);
memory that stores operational instructions; and
a processor operably coupled to the interface and to the memory, wherein the processor operates within the computing device based on the operational instructions to:
receive, via the interface and from another computing device, a request associated with an encoded data slice (EDS) name range, wherein the EDS name range is included within a plurality of EDS name ranges that respectively correspond to object names, wherein each EDS name corresponds to a respective one of the object names of a plurality of data objects that are distributedly stored in a plurality of storage units (SUs) within the DSN, wherein a data object of the plurality of data objects is segmented into a plurality of data segments, a data segment of the plurality of data segments is dispersed error encoded in accordance with dispersed error encoding parameters to produce a set of encoded data slices (EDSs) that are distributedly stored in at least some of the plurality of SUs within the DSN, and a decode threshold number of EDSs are needed to recover the data segment, wherein:
the request associated with the EDS name range includes at least one of a data access request or an EDS request;
the data access request includes at least one of a data object write request, a data object read request, a data object list request, or a data object delete request; and
the EDS request includes at least one of an EDS write request, an EDS read request, an EDS list request, or an EDS delete request;
access an EDS priority table to identify a priority level associated with the EDS name range, wherein the EDS priority table specifies a plurality of priority levels associated with the plurality of EDS name ranges;
process the request associated with the EDS name range based on the priority level associated with the EDS name range including resources within the DSN, via the interface, wherein an amount of resources within the DSN that are allocated corresponds to the priority level, and wherein a first priority level of the plurality of priority levels associated with the plurality of EDS name ranges corresponds to a first amount of resources within the DSN, and a second priority level of the plurality of priority levels associated with the plurality of EDS name ranges corresponds to a second amount of resources within the DSN that is less than the first amount of resources within the DSN based on the first priority level being higher than the second priority level; and
process the request associated with the EDS name range to generate a set of DSN access requests that includes a set of corresponding EDS names, wherein the EDS name range corresponds to an EDS name of the set of DSN access requests based on at least one of an identified priority level or at least one other priority level associated with at least one other request.

10. The computing device of claim 9, wherein the processor operates within the computing device based on the operational instructions, is further configured to: receive name range information and priority level information to handle the plurality of data objects associated with the name range information; identify object names of the plurality of data objects associated with a name range of the name range information; identify EDS name ranges that respectively correspond to the object names, wherein each EDS name range corresponds to a respective one of the object names; and update the EDS priority table to associate at least one EDS name range of the EDS name ranges with the priority level information.

11. The computing device of claim 9, wherein:
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

12. The computing device of claim 9, wherein the computing device is a SU of the plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:
receiving, via an interface of the computing device that is configured to interface and communicate with a dispersed or distributed storage network (DSN) and from another computing device, a request associated with an encoded data slice (EDS) name range, wherein the EDS name range is included within a plurality of EDS name ranges that respectively correspond to object names, wherein each EDS name corresponds to a respective one of the object names of a plurality of data objects that are distributedly stored in a plurality of storage units (SUs) within the DSN, wherein a data object of the plurality of data objects is segmented into a plurality of data segments, a data segment of the plurality of data segments is dispersed error encoded in accordance with dispersed error encoding parameters to produce a set of encoded data slices (EDSs) that are distributedly stored in at least some of the plurality of SUs within the DSN, and a decode threshold number of EDSs are needed to recover the data segment;
accessing an EDS priority table to identify a priority level associated with the EDS name range, wherein the EDS priority table specifies a plurality of priority levels associated with the plurality of EDS name ranges; and
processing the request associated with the EDS name range based on the priority level associated with the EDS name range including resources within the DSN, via the interface, wherein an amount of resources within the DSN that are allocated corresponds to the priority level, and wherein a first priority level of the plurality of priority levels associated with the plurality of EDS name ranges corresponds to a first amount of resources within the DSN, and a second priority level of the plurality of priority levels associated with the plurality of EDS name ranges corresponds to a second amount of resources within the DSN that is less than the first amount of resources within the DSN based on the first priority level being higher than the second priority level.

15. The method of claim 14 further comprising:

receiving name range information and priority level information to handle the plurality of data objects associated with the name range information;

identifying object names of the plurality of data objects associated with a name range of the name range information;

identifying EDS name ranges that respectively correspond to the object names, wherein each EDS name range corresponds to a respective one of the object names; and updating the EDS priority table to associate at least one EDS name range of the EDS name ranges with the priority level information.

16. The method of claim 14, wherein:

the request associated with the EDS name range includes at least one of a data access request or an EDS request;

the data access request includes at least one of a data object write request, a data object read request, a data object list request, or a data object delete request; and the EDS request includes at least one of an EDS write request, an EDS read request, an EDS list request, or an EDS delete request.

17. The method of claim 14 further comprising:

processing the request associated with the EDS name range to generate a set of DSN access requests that includes a set of corresponding EDS names, wherein the EDS name range corresponds to an EDS name of the set of DSN access requests based on at least one of an identified priority level or at least one other priority level associated with at least one other request.

18. The method of claim 14, wherein:

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

19. The method of claim 14, wherein the computing device is a SU of the plurality of SUs within the DSN, a wireless smart phone, a laptop, a tablet, a personal computers (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *